UNITED STATES PATENT OFFICE.

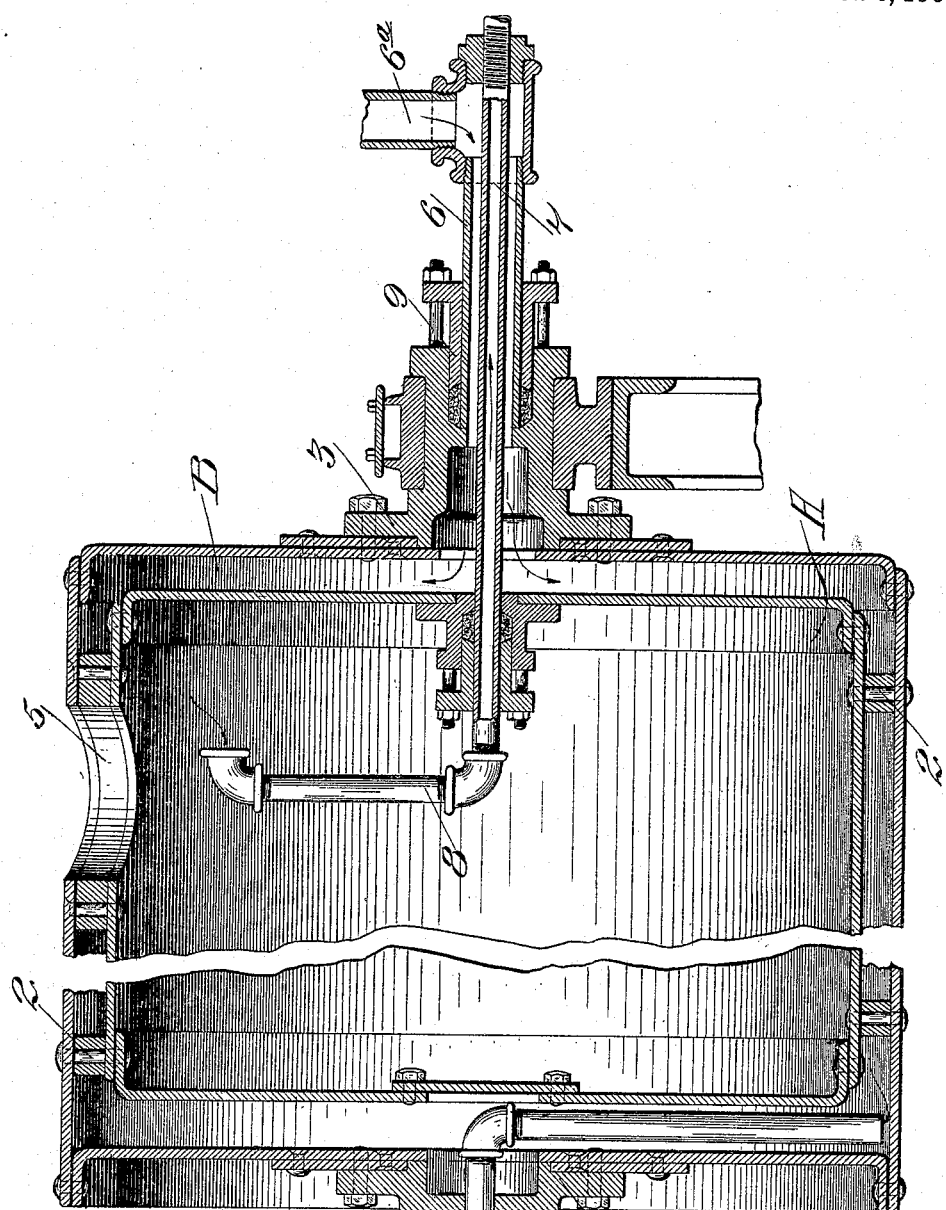

JESSE O. SNYDER AND FRANK O. CLAWSON, OF SOUTH SAN FRANCISCO, CALIFORNIA.

ROTARY VACUUM-DRIER.

No. 900,436.     Specification of Letters Patent.     Patented Oct. 6, 1908.

Application filed April 22, 1908. Serial No. 428,522.

*To all whom it may concern:*

Be it known that we, JESSE O. SNYDER and FRANK O. CLAWSON, citizens of the United States, residing at South San Francisco, in the county of San Mateo and State of California, have invented new and useful Improvements in Rotary Vacuum-Driers, of which the following is a specification.

Our invention relates to an apparatus for drying or desiccating substances.

It consists in a combination of parts, and in details of construction which will be more fully explained by reference to the accompanying drawings, in which—the figure is a vertical section of our device.

It is the object of our invention to provide an apparatus by which substances, such as chicken feed, fertilizers, and other material may be rapidly desiccated in a shredded or subdivided condition suitable for subsequent use.

The apparatus consists of an inner drum or chamber A, and an outer chamber B of larger size, within which the chamber A is contained, the two being united by suitable stay bolts 2 to retain them in their relative position, and to strengthen them against pressure which may be applied thereto. These chambers may be of any suitable or desired shape, either cylindrical or polygonal, and they are supported by trunnions 3, projecting centrally through each end, and carried upon suitable bearings so that the apparatus may be revolved by the application of gearing or other transmitting devices from any suitable motor, and at any desired rate of speed.

The chamber A is provided with a suitable manhole 5. Through this manhole, or a plurality of such manholes, if desired, material may be introduced into the inner drum or chamber, to any desired extent. It will be understood that the drum may be of a length sufficient to handle large quantities of material to be desiccated at each charge, and that each manhole will, in practice, be provided with an appropriate closure, not shown.

Through one of the trunnions extends a steam pipe 6 connected through a suitable tee with a branch pipe 6ª through which steam may be transmitted to the space between the two drums A and B. Steam is introduced, under any desired pressure, and the apparatus being slowly revolved, the material within the inner drum, will be submitted to the action of the heat without its moisture, and the temperature will thus be raised to the desired drying or desiccating point.

7 is a pipe of smaller diameter passing through the pipe 6, and the trunnion, and having an upturned branch 8 within the inner drum; the end of said branch being curved or turned so as to prevent the ingress of material which is being introduced or operated upon. This pipe passes through a suitable stuffing-box at the outer end as shown at 9, and is maintained in a stationary position, not turning with the drum. This pipe serves for the escape of all moisture and effluvia from the material treated which may be discharged into a sewer condenser, or afterwards disposed of.

10 is a pipe entering through the opposite trunnion, with suitable stuffing-box and having a bend and extension downward in the space between the two drums, the lower end of the extension being sufficiently close to the bottom of the outer drum, so that any water of condensation which gathers at this point, will be driven off and discharged by opening a suitable cock from this pipe from time to time.

By means of an apparatus of this kind, fragments of meat and scraps of various kinds, which are the especial product of slaughter-houses, may be shredded and desiccated, so that portions may be used for chicken-feed, other portions for fertilizers, and for various purposes to which such products may be applied, and all offensive odors and effluvia may be withdrawn during the process of drying, so that the completed product will be comparatively innocuous.

Having thus described our invention, what we claim and desire to secure by Letters Patent is—

1. In an apparatus of the character described, concentric interspaced drums, with supporting stay-bolts, trunnions at opposite ends upon which the drums are mounted and revoluble, a steam pipe entering through one of said trunnions, with a surrounding stuffing-box whereby steam is admitted into the interspace between the drums, a second pipe entering the opposite trunnion having a down-turned stationary extension within the interspace, whereby the water of condensation may be removed from time to time.

2. In an apparatus of the character described, concentric interspaced drums, with supporting stay-bolts, means for introducing material to be dried into the inner drum, trunnions upon which the drums are mounted and revoluble, a steam pipe passing through one of said trunnions, and a stuffing-box therefor, and discharging into the space between the drums, a pipe of smaller diameter passing through said steam pipe, having a stuffing-box at the outer end, and another where the pipe enters the inner drum, said pipe having an upturned stationary branch whereby vapors and effluvia from the contained mass are discharged.

3. In an apparatus of the character described, concentric interspaced drums with supporting stay-bolts, hollow trunnions upon which the drums are supported and revoluble, a steam pipe extending through one of said trunnions, delivering steam into the interspace between the drums, a stationary interior pipe passing through the steam pipe into the inner drum having an upturned end, said inner pipe having stuffing-boxes at the outer and inner ends, and a stationary pipe extending through the other trunnion, and to the bottom of the space between the drums, and serving to conduct away water of condensation.

In testimony whereof we have hereunto set our hands in presence of two subscribing witnesses.

JESSE O. SNYDER.
FRANK O. CLAWSON.

Witnesses:
FRED A. CUNNINGHAM,
E. E. CUNNINGHAM.